United States Patent
Tamura et al.

(10) Patent No.: US 8,557,413 B2
(45) Date of Patent: Oct. 15, 2013

(54) METHOD OF CHARGING AND DISCHARGING LITHIUM SECONDARY BATTERY AND LITHIUM SECONDARY BATTERY

(75) Inventors: Noriyuki Tamura, Kobe (JP); Maruo Kamino, Kobe (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1460 days.

(21) Appl. No.: 10/807,378

(22) Filed: Mar. 24, 2004

(65) Prior Publication Data

US 2004/0191609 A1  Sep. 30, 2004

(30) Foreign Application Priority Data

Mar. 25, 2003 (JP) .................................. 2003-082622

(51) Int. Cl.
*H01M 10/44* (2006.01)
*H01M 4/13* (2010.01)
*H01M 4/66* (2006.01)

(52) U.S. Cl.
USPC .......................... 429/50; 429/231.95; 429/245

(58) Field of Classification Search
None
See application file for complete search history.

(56) References Cited

U.S. PATENT DOCUMENTS

| 5,998,052 A * | 12/1999 | Yamin ................................ 429/9 |
| 7,195,842 B1 * | 3/2007 | Fujimoto et al. ............... 429/209 |
| 2002/0144160 A1 * | 10/2002 | Odaohhara et al. ............ 713/300 |

FOREIGN PATENT DOCUMENTS

| JP | 11-283627 A | 10/1999 |
| WO | 01/31720 A1 | 5/2001 |

OTHER PUBLICATIONS

Official English Translation of WO 01/31720.*
Obrovac, M.N. et al., "Structural Changes in Silicon Anodes during Lithium Insertion/Extraction", *Electrochemical and Solid-State Letters*, 7 (5), 2004, pp. A93-A96.
Tamori, Ryo et al., "Preparation of $Li_{4.4}Si$ Alloy by Use of Mechanical Milling Methods and Its Properties as Negative Electrodes in Lithium Cells", *Journal of the Japan Society of Powder and Powder Metallurgy*, vol. 48, No. 3, 2001, pp. 584-590.

* cited by examiner

*Primary Examiner* — Ula C Ruddock
*Assistant Examiner* — Matthew Van Oudenaren
(74) *Attorney, Agent, or Firm* — McDermott Will & Emery LLP

(57) ABSTRACT

A method of charging and discharging a lithium secondary battery in which a negative electrode comprises an active material including silicon provided on a current collector which is a metal which does not form an alloy with lithium. The method is characterized in that the lithium secondary battery is charged and discharged within a range of state of charge (SOC) at which no peak corresponding to a compound of lithium and silicon is observed in an X-ray diffraction pattern during charging using $CuK_\alpha$-radiation as the X-ray source.

16 Claims, 1 Drawing Sheet

METHOD OF CHARGING AND DISCHARGING LITHIUM SECONDARY BATTERY AND LITHIUM SECONDARY BATTERY

FIELD OF THE INVENTION

The present invention relates to a method of charging and discharging a lithium secondary battery having a negative electrode wherein an active material layer containing silicon is formed on a current collector and also relates to a lithium secondary battery.

BACKGROUND OF THE INVENTION

Silicon is a material capable of occluding lithium by alloying lithium and has recently become attractive as a material for obtaining a high energy density battery because of its high theoretical capacity. However, there is a problem that cycle characteristics of an electrode including silicon as an active material are worse than that of a carbon material such as graphite. One of the causes for this is believed to be that expansion and shrinkage of the silicon active material during charge and discharge are large and create stress. The active material is pulverized and separates from the current collector and deteriorates current collectability.

It has been found that gaps are formed in a direction of thickness of a thin film of an amorphous silicon deposited on a current collector such as a copper foil by charge and discharge and the thin film is divided into columns by the gaps and such thin film provides excellent cycle characteristics (International Publication No. WO 01/31720.)

However, there have not been any proposals relating to conditions of charging and discharging for improving the cycle characteristics of an electrode.

OBJECT OF THE INVENTION

An object of the present invention is to provide a method of charging and discharging a lithium secondary battery in which an electrode of the battery includes an active material layer containing silicon formed on a current collector and provides excellent cycle characteristics. Another object is to provide an improved lithium secondary battery.

SUMMARY OF THE INVENTION

The present invention relates to a method of charging and discharging a lithium secondary battery wherein a negative electrode comprises an active material containing silicon provided on a current collector comprising a metal which does not form an alloy with lithium. The method is characterized in that the lithium secondary battery is charged and discharged within a range of state of charge (SOC) at which a peak corresponding to a compound of lithium and silicon is not observed in an X-ray diffraction pattern during charging using $CuK_\alpha$-radiation as the X-ray source.

It is possible to improve cycle characteristics of the lithium secondary battery by the charging and discharging method according to the present invention.

A further limited aspect of the present invention relates to a method of charging and discharging a lithium secondary battery comprising a negative electrode in which an amorphous silicon thin layer is formed by deposition on a current collector comprising a metal which does not form an alloy with lithium. This aspect is characterized in that the lithium secondary battery is charged and discharged within a range of state of charge where no peak, except for a peak derived from the current collector, is observed in the X-ray diffraction pattern (using $CuK_\alpha$-radiation as the X-ray source) of the negative electrode during charging.

It is possible to further improve cycle characteristics of the lithium secondary battery by charging and discharging according to the above-described method.

The present invention also relates to a lithium secondary battery comprising a negative electrode having an active material layer including silicon provided on a current collector comprising a metal which does not form an alloy with lithium, wherein no peak corresponding to a compound of silicon and lithium is observed in an X-ray diffraction pattern of the negative electrode during charging using $CuK_\alpha$-radiation as the X-ray source.

A further limited aspect of the present invention relates a lithium secondary battery comprising a negative electrode having an active material layer containing silicon provided on a current collector comprising a metal which does not form an alloy with lithium, wherein the active material layer comprises a thin film of amorphous silicon deposited on the current collector and no peak except for a peak corresponding to the current collector is observed in the X-ray diffraction pattern of the negative electrode during charging using $CuK_\alpha$-radiation as the X-ray source.

As a concrete method of providing a battery in which no peak except for a peak corresponding to the current collector is observed in the X-ray diffraction pattern of the negative electrode during charging using $CuK_\alpha$-radiation as the X-ray source, adjustment of an amount of a positive electrode active material or control of a charge ending voltage of the battery by a battery charger can be illustrated.

EXPLANATION OF ELEMENTS

Figure 1:
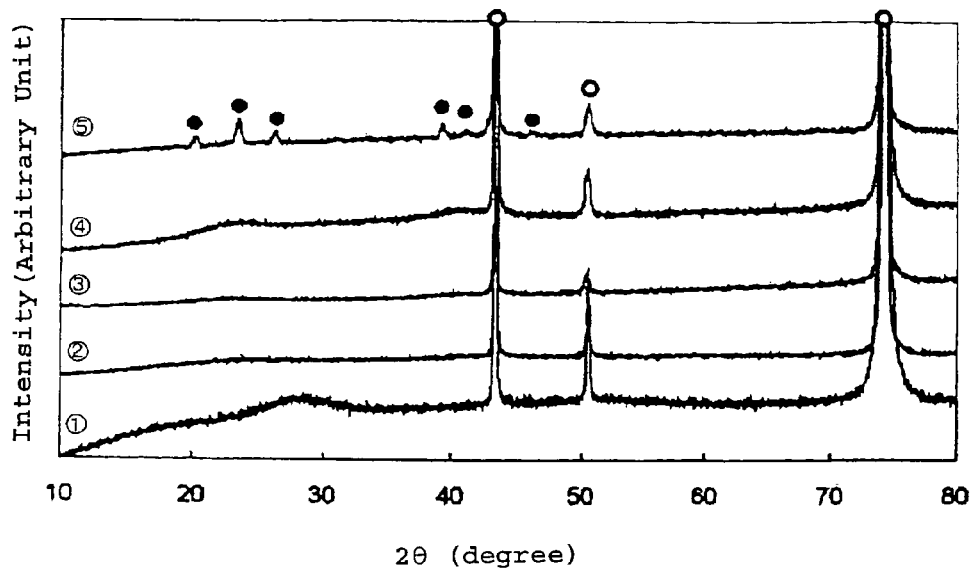
FIG. 1 is an X-ray diffraction pattern of a negative electrode at the first cycle during charging.

1: container
2: electrolyte
3: counter electrode
4: working electrode
5: reference electrode

DETAILED EXPLANATION OF THE INVENTION

A compound of lithium and silicon is formed in an electrode (a negative electrode) which includes silicon in an active material layer when the electrode is charged at a gradually increased state of charge and a large amount of lithium ions are occluded in the active material in the negative electrode. When a crystalline compound is formed which produces a peak in an X-ray diffraction pattern using $CuK_\alpha$-radiation as the X-ray source, it was noted that the cycle characteristics are deteriorated. The concept of the present invention was obtained from such discovery.

As the compound of lithium and silicon, an intermetallic compound of lithium and silicon can be illustrated. When lithium is occluded in silicon to form a solid solution having no crystallinity, cycle characteristics can be improved. However, when an intermetallic compound having crystallinity is formed, reversibility of the occluding and releasing of lithium is lost and it is believed that cycle characteristics are deteriorated.

As the intermetallic compound, $Li_{13}Si_4$ can be illustrated. Three peaks are observed for this compound in a range of 18~28° of an X-ray diffraction pattern using $CuK_\alpha$-radiation as the X-ray source. A peak in a range of 18~28° is observed as a halo pattern during formation of the compound. It is recognized that cycle characteristics start to deteriorate at the stage where the halo pattern is observed.

The active material layer including silicon is, for example, a layer formed by deposition of silicon. As a method of forming the layer, CVD, sputtering, vacuum deposition, spray coating, and the like can be illustrated. The active material layer including silicon can also be a layer that is formed by the coating of a slurry containing silicon particles and a binder on a current collector. That is, the active material layer can be a layer comprising silicon particles and a binder. As an alloy containing silicon, Si—Cu, Si—Co, and the like can be illustrated.

The current collector is made of a metal which does not alloy with lithium. As the metal, copper, nickel, iron, titanium, cobalt, molybdenum, tungsten, tantalum, and the like, and an alloy thereof can be illustrated. Copper and copper alloy are especially preferred. A current collector having an uneven surface on a side where the active material layer is formed is preferred. From this point of view, an electrolytic copper foil or an electrolytic copper alloy foil is preferably used.

In the present invention when the active material layer is a thin silicon film, it is preferred that the silicon film is separated into columns by gaps formed in a direction of its thickness and the columns at their bottoms are adhered to the current collector. Spaces provided surrounding the columns makes it possible to absorb expansion and shrinkage of the thin film during charge and discharge and to thereby reduce stress caused by such expansion and shrinkage. Pulverizing of the active material or falling-off of the active material from the current collector can be prevented to improve cycle characteristics.

As described above, the surface of the current collector is preferably uneven. When the surface of the side where the thin film is formed is uneven, the active material layer cracks to divide the thin film into columns after charge and discharge are started. A surface roughness (Ra) of the current collector is preferably in a range of about 0.01~2 μm, more preferably about 0.1~2 μm. The surface roughness (Ra) is defined in the Japanese Industrial Standards (JIS B 0601-1994), and can be measured by a surface roughness tester.

There is no limitation with respect to an active material for the positive electrode if the material can be used as an active material for a positive electrode. A transition metal oxide including lithium, for example, $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$, and the like, and a metal oxide not including lithium, for example, $MnO_2$, and the like, can be illustrated. Other materials capable of occluding and releasing lithium electrochemically can be used without limitation.

There is no limitation with respect to a solvent for a non-aqueous electrolyte used for the lithium secondary battery. A mixed solvent of cyclic carbonates, for example, ethylene carbonate, propylene carbonate, butylene carbonate, vinylene carbonate, and the like, and chain carbonates, for example, dimethyl carbonate, methylethyl carbonate, diethyl carbonate, and the like, can be used. A mixture of a cyclic carbonate described above and an ether, for example, 1,2-dimethoxyethane, 1,2-diethoxyethane, and the like, can also be used.

There is no limitation with respect to a solute used in the electrolyte. $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}Li_2B_{12}Cl_{12}$, and the like, can be used alone or in a combination thereof.

As the electrolyte, a gel polymer electrolyte, for example, polyethylene oxide, polyacrylonitrile, and the like, and an inorganic solid electrolyte, for example, LiI, $Li_3N$, and the like, can also be illustrated.

The lithium secondary battery of the present invention comprises a positive electrode including a positive electrode active material and a negative electrode having an active material layer including silicon provided on a current collector comprising a metal which does not form an alloy with lithium. In the lithium secondary battery of the invention the characteristic that no peak corresponding to a compound of silicon and lithium is observed in an X-ray diffraction pattern of the negative electrode during charging using $CuK_\alpha$-radiation as the X-ray source is obtained by limiting the amount of positive electrode active material to an amount which limits the charge capacity of the battery to 90% or less of the maximum capacity of the negative electrode.

The maximum capacity of the negative electrode means the capacity obtained when the battery is charged (i.e., the negative electrode is reduced) at a current density of 0.1 mA/cm² to 0.00 V (vs. Li/Li⁺).

It is also possible to provide the characteristic that no peak corresponding to a compound of silicon and lithium is observed in an X-ray diffraction pattern of the negative electrode during charging using $CuK_\alpha$-radiation as the X-ray source by combining a lithium secondary battery of the present invention comprising a positive electrode including a positive electrode active material and a negative electrode having an active material layer including silicon provided on a current collector comprising a metal which does not form an alloy with lithium with a battery charger which controls a charge ending voltage of the battery to that which limits charging to within a range of state of charge (SOC) where no peak corresponding to a compound of silicon and lithium is observed in an X-ray diffraction pattern of the negative electrode during charging using $CuK_\alpha$-radiation as the X-ray source.

In one embodiment of the lithium secondary battery of the present invention, the active material layer of the negative electrode which is provided on a current collector comprising a metal which does not form an alloy with lithium comprises a thin film of amorphous silicon deposited on the current collector.

DESCRIPTION OF PREFERRED EMBODIMENT

Embodiments of the present invention are explained in detail below. It is of course understood that the present invention is not limited to these embodiments and can be modified within the spirit and scope of the appended claims.

Preparation of Electrode

Copper was deposited by an electrolysis method on a surface of a rolled copper foil having a thickness of 18 μm to prepare a copper foil for a current collector having an uneven surface and having a thickness of 26 μm and a surface roughness (Ra) of 0.6 μm. An amorphous silicon layer was formed by sputtering at a thickness of 5 μm on the current collector. Conditions of sputtering were as follows:

| | |
|---|---|
| Direct current pulse frequency: | 100 kHz |
| Direct current pulse width: | 1856 ns |
| Direct current pulse power: | 2000 W |
| Argon flow rate: | 60 sccm |
| Gas pressure: | $2\sim2.5\times10^{-1}$ Pa |
| Sputtering time: | 146 minutes |

Although a direct current pulse was used for sputtering in this example, direct current or a high frequency can be used for sputtering under similar conditions.

Preparation of Electrolyte $LiPF_6$ was dissolved in a mixture of ethylene carbonate and diethyl carbonate in a ratio of 3:7 by volume to a concentration of 1 mol/l to prepare an electrolyte.

Assembly of Beaker Cell

Figure 2:
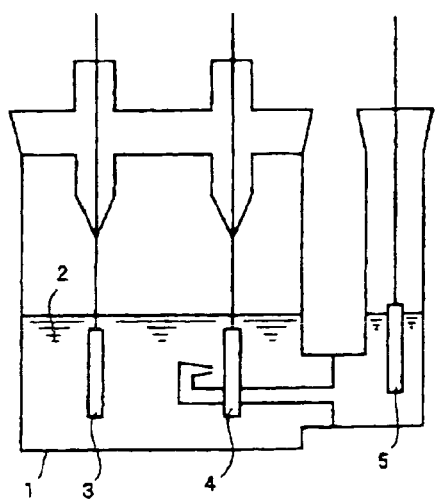
FIG. 2 is a drawing illustrating a beaker cell used in a single electrode test.

A beaker cell was prepared as shown in FIG. 2 using the electrode prepared above which was cut to a size of 2 cm×2 cm as a working electrode. As shown in FIG. 2, the beaker cell comprises a counter electrode 3, the working electrode 4 and a reference electrode 5 in an electrolyte 2 in a container 1. The electrolyte prepared above was used as the electrolyte 2. A lithium metal was used as the counter electrode 3 and the reference electrode 5.

Cycle Test

The beaker cell prepared above was charged at two levels of constant current, i.e., 2 mA and 1 mA, at 25° C. to 0.20 V (vs. $Li/Li^+$), then was charged at a constant current of 0.4 mA to a potential as shown in Table 1. A state of charge and the potential at the end of charge are shown in Table 1. The state of charge was calculated such that capacity is 100% when charge is completed to 0.00 V (vs. $Li/Li^+$) at the conditions described above. The cell was discharged at three levels of current density, i.e., 2 mA, 1 mA and 0.4 mA, to 2 V (vs. $Li/Li^+$). 18 cycles of such charge and discharge were repeated. A capacity retention rate on the 18$^{th}$ cycle was calculated as follows and the results are shown in Table 1.

Capacity Retention Rate on the 18$^{th}$ Cycle=Discharge capacity on the 18$^{th}$ Cycle/Discharge capacity on the 1$^{st}$ Cycle Reduction of the working electrode is considered charge and oxidation of the working electrode is considered discharge.

TABLE 1

| Sample | Potential at End of Charge (V vs. $Li/Li^+$) | Capacity Retention Rate on the 18$^{th}$ Cycle |
|---|---|---|
| ① As-deposited film | — | — |
| ② 50% SOC (Example) | 0.16 | 100% |
| ③ 70% SOC (Example) | 0.09 | 100% |
| ④ 90% SOC (Example) | 0.04 | 94% |
| ⑤ 100% SOC (Comparative Example) | 0.00 | 86% |

X-ray diffraction patterns of samples ①~⑤ shown in Table 1 were obtained by X-ray diffraction analysis using Cu-$K_\alpha$ radiation. The chart obtained for each sample is shown in FIG. 1. The X-ray diffraction analysis was conducted at a charge condition of the first cycle for samples ②~⑤.

In FIG. 1, ○ identifies a peak derived from copper which is the current collector. Peaks identified by ● in FIG. 1 are similar to an intermetallic compound, $Li_{13}Si_4$. Therefore, peaks identified by ● are believed to be derived from an intermetallic compound of Li—Si. A peak identified by ● in a range of 18~28° is higher as compared to other peaks identified by ●. Sample ④ had a halo pattern in a range of 18~28°.

It is noted from the results shown in Table 1 and FIG. 1 that samples ②~④ that were charged and discharged at a state of charge at which there are no clear peaks corresponding to a crystalline structure in a range of 18~28° in the X-ray diffraction pattern have better cycle characteristics as compared to sample ⑤ that was charged and discharged through a state of charge at which peaks corresponding to a crystalline structure were observed in a range of 18~28° in the X-ray diffraction pattern. Samples ② and ③ have more improved cycle characteristics than sample ④ which was charged and discharged through a state of charge in which a halo pattern was observed in a range of 18~28°. It is believed from the results that a change of structure of the active material can be prevented when the electrode is charged and discharged within a range of state of charge where there are no peaks corresponding to a compound of lithium and silicon observed by X-ray diffraction analysis using Cu-$K_\alpha$ radiation and that cycle characteristics can be improved. It is believed that when a compound of lithium and silicon is formed, reversibility of occluding and releasing of lithium is partially lost and stress of the active material increases during charge and discharge to cause pulverizing of the active material or falling-off of the active material from the current collector.

A single electrode test using the beaker cell was adopted for evaluation in the above example. However, charge and discharge characteristics similar to the above example are obtained in a lithium secondary battery comprising a negative electrode that is the same as the negative electrode used in the above example and using a transition metal oxide, and the like, as a positive active material. Therefore, the method of the present invention can improve cycle characteristics of the lithium secondary battery.

ADVANTAGES OF THE INVENTION

The present invention improves cycle characteristics of a lithium secondary battery comprising a negative electrode wherein the electrode includes an active material layer containing silicon provided on a current collector.

What is claimed is:

1. A method of improving the cycle characteristics of a lithium secondary battery which includes (a) a negative electrode having an active material layer including silicon provided on a current collector comprising a metal which does not form an alloy with lithium, (b) a positive electrode, and (c) a nonaqueous electrolyte, comprising charging and discharging the lithium secondary battery within a range of state of charge (SOC) of negative electrode (a) where no peak corresponding to a compound of silicon and lithium is observed in an X-ray diffraction of negative electrode (a) using CuK$_\alpha$ rays as the X-ray source, wherein said state of charge (SOC) of negative electrode (a) is calculated from the following steps:

a step of forming a first negative electrode corresponding to negative electrode (a) by forming an active material layer including silicon on a current collector comprising a metal which does not form an alloy with lithium;

a step of forming a first cell by using the first negative electrode as a working electrode and using a lithium metal as a counter electrode and as a reference electrode and by immersing the working electrode, the counter electrode, and the reference electrode in an electrolyte;

a step of, regarding the first negative electrode, charging at two levels of constant current, which are 2 mA and 1 mA, to 0.20 V (vs. Li/Li+), then charging at a current of 0.4 mA to 0.00 V (vs. Li/Li+) using the first cell and setting capacity at an end of the charging as a state of charge (SOC) of the first negative electrode=100%;

a step of forming a second negative electrode corresponding to negative electrode (a) under the same conditions as the conditions of forming the first negative electrode;

a step of forming a second cell by using the second negative electrode as a working electrode and using a lithium metal as a counter electrode and as a reference electrode and by immersing the working electrode, the counter electrode, and the reference electrode in an electrolyte;

a step of, regarding the second negative electrode, charging at two levels of constant current, which are 2 mA and 1 mA, to 0.20 V (vs. Li/Li+), charging at a current of 0.4 mA to a predetermined voltage level (vs. Li/Li+) using the second cell and setting capacity at the end of charging to the predetermined voltage level (vs. Li/Li+) as the capacity of the second negative electrode; and calculating a ratio of the capacity of the second negative electrode to the capacity of the first negative electrode in terms of percentage, and then setting the calculated percentage as said state of charge (SOC) of negative electrode (a).

2. The method according to claim 1, wherein the active material layer comprises a thin film of amorphous silicon deposited on the current collector.

3. The method according to claim 1, wherein no peak corresponding to an intermetallic compound of lithium and silicon is observed in the X-ray diffraction pattern.

4. The method according to claim 2, wherein no peak corresponding to an intermetallic compound of lithium and silicon is observed in the X-ray diffraction pattern.

5. The method according to claim 3, wherein the intermetallic compound is $Li_{13}Si_4$.

6. The method according to claim 4, wherein the intermetallic compound is $Li_{13}Si_4$.

7. The method according to claim 1, wherein no peak is observed in the X-ray diffraction pattern in a range of 18~28°.

8. The method according to claim 2, wherein no peak is observed in the X-ray diffraction pattern a range of 18~28°.

9. The method according to claim 7, wherein no peak is observed as a halo pattern in the X-ray diffraction pattern in a range of 18~28°.

10. The method according to claim 8, wherein no peak is observed as a halo pattern in the X-ray diffraction pattern in a range of 18~28°.

11. The method according to claim 7, wherein no peak in the form of three peaks is observed in the X-ray diffraction pattern in a range of 18~28°.

12. The method according to claim 8, wherein no peak in the form of three peaks is observed in the X-ray diffraction pattern in a range of 18~28°.

13. The method according to claim 1, wherein the active material layer comprises silicon particles and a binder.

14. The method according to claim 1, wherein the active material layer is a thin silicon film formed by deposition.

15. The method according to claim 1, wherein the current collector comprises copper or a copper alloy.

16. The method according to claim 2, wherein the current collector comprises copper or a copper alloy.

* * * * *